United States Patent [19]

Fujii et al.

[11] Patent Number: 4,857,256
[45] Date of Patent: Aug. 15, 1989

[54] JIGGERING METHOD AND PROFILE TOOL FOR CERAMIC WARE PLASTIC CLAY

[76] Inventors: Shigemi Fujii, Handa; Eisuke Kumazaki, Nagoya; Kazutoshi Shigematsu, Tajimi, all of Japan

[21] Appl. No.: 47,173

[22] Filed: May 7, 1987

Related U.S. Application Data

[63] Continuation-in-part of Ser. No. 785,355, Oct. 7, 1985, Pat. No. 4,786,457.

[30] Foreign Application Priority Data

Oct. 8, 1984 [JP] Japan ................... 59-209771

[51] Int. Cl.⁴ ............................... B28B 1/02
[52] U.S. Cl. .................... 264/310; 264/319; 425/267; 425/459
[58] Field of Search ................ 425/265–268, 425/263, 459, 376 R, 378 R, 72 R, 95, 97, DIG. 29, DIG. 120, DIG. 202; 264/209.3, 209.4, 209.8, 312, 177.17, 319, 310, 311; 72/67, 69

[56] References Cited

U.S. PATENT DOCUMENTS

| | | | |
|---|---|---|---|
| 1,430,363 | 9/1922 | Dolley | 425/267 |
| 1,769,529 | 7/1930 | Miller | 264/319 |
| 1,769,530 | 7/1930 | Miller | 425/268 X |
| 1,850,939 | 3/1932 | Miller | 425/268 X |
| 2,384,845 | 9/1945 | Miller | 425/267 X |
| 2,439,407 | 4/1948 | Miller | 425/268 X |
| 2,480,062 | 8/1949 | Wahl et al. | 425/267 X |
| 2,485,159 | 10/1949 | Malarkey | 425/267 |
| 2,726,433 | 12/1955 | Skunda | 425/268 X |
| 2,876,522 | 3/1959 | Johnson | 425/267 |

FOREIGN PATENT DOCUMENTS

| | | |
|---|---|---|
| 30-6281 | 9/1955 | Japan . |
| 44-7102 | 3/1969 | Japan . |
| 56-75812 | 6/1981 | Japan . |
| 56-75812 | 6/1981 | Japan . |
| 58-59802 | 4/1983 | Japan . |
| 58-59802 | 4/1983 | Japan . |

OTHER PUBLICATIONS

References Checked Cited in Parent Case SN 785355.

*Primary Examiner*—Richard L. Chiesa
*Attorney, Agent, or Firm*—Irell & Manella

[57] ABSTRACT

Jiggering for ceramic ware is effected while providing a jiggering surface of a jiggering profile tool with a gas to produce a thin gas film between the jiggering surface and plastic clay. The gas film is formed by a gas fed from the outside of the jiggering surface and the jiggering profile tool is heated to 50°–60° C. High-temperature heating of the tool is dispensed with.

16 Claims, 6 Drawing Sheets

JIGGERING METHOD AND PROFILE TOOL FOR CERAMIC WARE PLASTIC CLAY

REFERENCE TO THE EARLIER APPLICATION

The present application is a continuation-in-part and divisional application of the U.S. patent application Ser. No. 785,355 filed on Oct. 7, 1985 and now U.S. Pat. No. 4,786,457.

FIELD OF THE INVENTION

The present invention relates to a jiggering method for ceramic ware plastic clay, particularly a jiggering method and apparatus of the rotary jiggering profile tool type as well as a profile tool to be used therefor.

BACKGROUND OF THE INVENTION

In most cases, the jiggering method of the rotary profile tool type uses as the tool material a metal material, which is heated to produce a steam film between the tool and the plastic clay to be subjected to contact-rolling (referred to as jiggering), thereby preventing that plastic clay from sticking to the tool, while keeping smooth contact therebetween. (This method shall hereinafter be referred to as the heated tool method; see Japanese Patent Kokoku-Publication No. 30-6281 in this regard.) In other words, the prior art rotary profile tool type jiggering method, as referred to just above, involves heating (to about 100° C.) a jiggering profile tool (roller) formed of an iron or aluminium material by cutting by means of a gas burner, an electric heater or the like to subject plastic clay to jiggering, while a steam film is produced between the tool and the plastic clay.

Japanese Patent Kokai Publication No. 56-75812 discloses a jiggering process wherein a thin gas film is produced either by rotating the gypsum mold at a high speed such that a gas film is produced at the contact area between the rotary jiggering profile tool and the plastic clay, or by blowing a gas to the contact area. The high speed rotation of the gypsum mold is about at a doubled speed (e.g., 900–1200 rpm) of the usual rotational speed (450–600 rpm for coffee or tea cups). Preferably, the rotary jiggering profile tool is rotated approximately about the same speed as the mold for producing the thin gas film.

SUMMARY OF THE DISCLOSURE

In the heated tool method as disclosed in JP-kokoku No. 30-6281, the surface temperature of the profile tool material is usually in a range of 95° to 105° C. Plastic clay sticks to the rolling (jiggering surface of the tool) at a temperature of lower than this range, whereas the resulting shaped product cracks on the rolling surface at a temperature exceeding the upper limit. For that reason, the aforesaid temperatures should constantly be maintained. However, there are some disadvantages in that to constantly keep a certain temperature requires considerable skill, working environment becomes worse due to heat dissipation, etc. In addition, to keep the tool in the heated state causes the conduction of heat to associated parts (e.g., a lever or rod), to which the tool is attached. As a result of those parts being heated due to such heat conduction, they suffer thermal expansion, so that the relative position between the tool and the mold varies, and an error takes place with respect to the rotary shafts therebetween. In consequence, there is an unavoidable change in the thickness of the resultant shaped product, which raises problems such as deteriorations in the shape accuracy thereof. Unless plastic clay (i.e., green ceramic material having plastic deformability) contains a certain propertion of clay (at least about 20% by weight), there are also cracking, sticking or other problems, resulting in unstable jiggering work. Thus, the heated tool method is hardly said to be generally employable.

On the other hand, JP-kokai No. 56-75812 has also disadvantages in that it cannot be utilized efficiently for shaping (jiggering) dishes or the like flat wares at the doubled high rotational speed (900 rpm or higher) and in that at a lower rotational speed surface irregularities like rough surface, recess formation on the surface or the like are entrained.

Thus there is much to be desired in the jiggering art.

The present invention has for its primary object to obviate the disadvantages of the prior art.

The jiggering method according to one aspect of the present invention is characterized in that jiggering is carried out by a jiggering profile tool heated at a temperature of 50°–60° C. while providing a thin gas film between plastic clay and the jiggering surface of a jiggering profile tool by supplying said surface with a gas, the gas being blown through a gas supply means for ejecting the gas from the outside of the jiggering surface of said tool into a space between said tool surface and said plastic clay.

In accordance with the present invention, it is not generally required that the tool be heated to high temperatures (in the prior art, the tool had to be heated at about 100° C. for efficient operation). The present invention provides shaped products of sufficiently high quality through the formation of a gas film achieved by gas feeding (ejecting or blowing) and through application of a jiggering profile tool heated at a lower temperature (50°–60° C.) while gas blowing is effected from the outside of the tool surface. The low-temperature heating of the profile tool does not give rise to drawbacks which would be caused by the conventional high temperature heating.

Gas blowing from the outside of the jiggering surface may be achieved through a nozzle or nozzles disposed in the vicinity thereof.

The jiggering profile tool according to the present invention is preferably of the rotary type, but the rotary type profile tool may be used at a stationary state. Usually, the rotary axis of the tool intersects that of an associated mold at a predetermined angle. An amount of plastic clay is placed and jiggered (rolled) between the tool and the mold (fixed onto the upper portion of a jigger), which rotate with each other.

In the rotary type jiggering method for ceramic ware according to the present invention, a gas (e.g., compressed air, etc.) is fed to the jiggering surface to be in contact with plastic clay to produce thereon a thin gas film, thereby preventing plastic clay from sticking to the tool. This provides an effect in preventing plastic clay from sticking to the tool like in the case as if the conventional heated jiggering profile tool be used to generate a steam film from plastic clay.

The present invention eliminates the limitations imposed by the prior art methods, and provides a jiggering method which makes jiggering (particularly rotary type) possible with a small number of attachments or accessories, can be used in wider ranges from cups or the like hollow wares to dishes or the like flat wares, and renders possible universal jiggering without recourse to any particular skill.

DETAILED DESCRIPTION OF THE PREFERRED EMBODIMENTS

Figure 1:
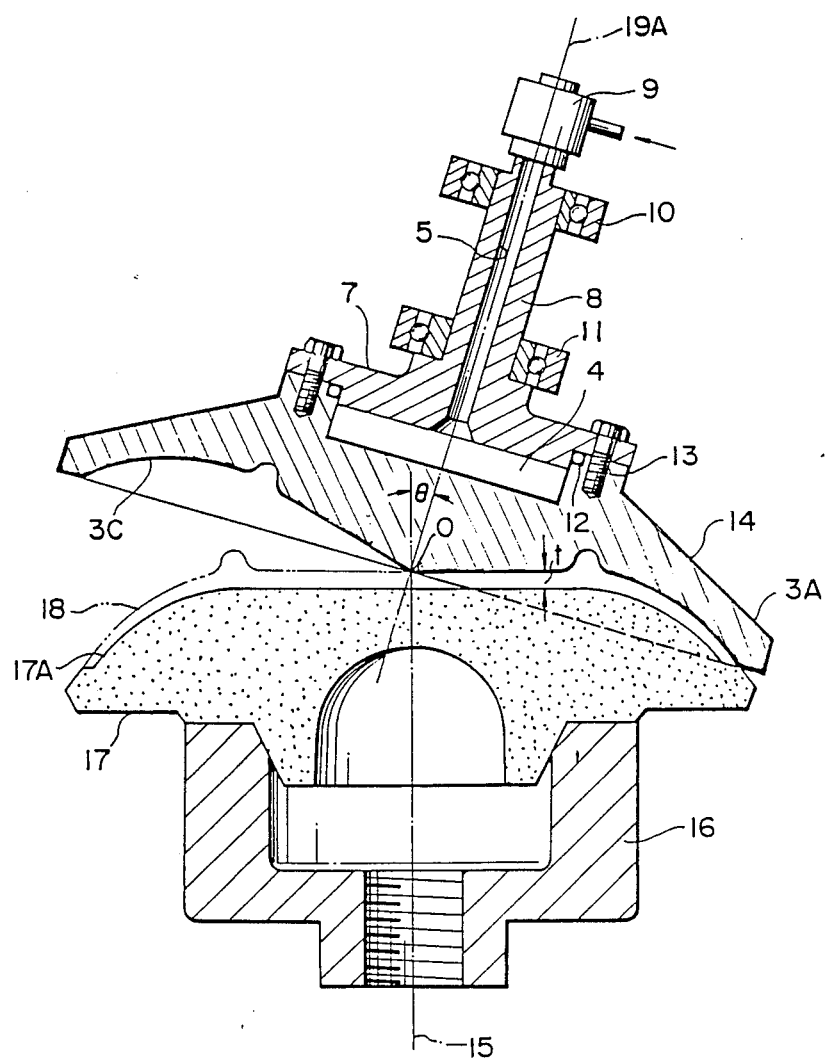
FIG. 1 is a sectional view showing one embodiment of the present invention.

The present invention will be explained. In the present disclosure, the term "ceramic ware" is understood in a broad sense. Thus, the present invention is generally applicable to the jiggering of ceramic green shaped bodies including whiteware.

Referring first to a jiggering profile tool it may be formed of a material having sufficient strength, smooth surface, wear resistance and certain heat resistance up to the heating temperature. It may be metal such as steel, however a porous or gas-permeable material such as plastics, metals (sintered metals), ceramics, etc. may be used so long as they give a predetermined amount of heat conductance.

Referring to the forcively rotating rotary jiggering (roller) method, modification of an ordinary rotary jigger machine is made to the rotary shaft, to which the profile tool is attached, so that, during jiggering, e.g., an amount of compressed air may be supplied toward the contact surface between the jiggering profile tool and rolling surface. The jiggering profile tool is then mounted in place. Next, jiggering is effected, while an amount of compressed air is fed to the profile tool, and rotation is given thereto by a separate tool-driving device during a jigger with a mold is rotating. In this case, an amount of air ejected from the outside of the tool provides a gas film between it and plastic clay to be subjected to jiggering (rolling), whereby the surface of the clay is smoothened without fear of the clay sticking to the tool.

To obtain sufficient results, pressurized air (preferably dry air) may be used as the gas to be supplied, but the present invention is not limited thereto. In carrying out jiggering according to the present invention, rolling effect is obtained by allowing the profile tool to rotate in the same direction as the jigger (mold) and with a difference in the peripheral speeds therebetween. Depending upon the conditions of plastic clay, etc., the jiggering profile tool used may rotate independently of the jigger (i.e., the mold) or following the jigger (without separate driving), or alternatively be stationary. Thus, the profile tool of the present invention is characterized in that it can be used in various versions and wide ranges to provide a certain predetermined difference in the rotational speed (or r.p.m.) between the jigger and the jiggering profile tool. Hence, the present invention is applicable to the jiggering of a variety of ceramic materials.

Such holders as mentioned above may not necessarily be used for tool materials having a sufficient strength, such as sintered metals, etc. In this case, they may be fixed directly to the rotary shaft (usually onto its end flange).

The jiggering profile tool may be formed of a nongas-permeable or dense mold material (metals, synthetic resin, ceramics). Where porous material is used, the periphery and the surface opposite to the jiggering surface of this profile tool must be provided with a suitable nonpermeable material (impregnated with resin or metal, etc.) or have to close up the pores of the sintered material.

In this manner, the use of a heated jiggering profile tool which required a temperature of 90° to 110° C. in the prior art may be eliminated. In the present invention, it is possible to apply low-temperature heating (approximately 50°–60° C.) wherein a successful jiggering is attained in the wide range with respect of the shape and size, and plastic clay conditions besides the jiggering speed may be somewhat enhanced. (Note, however, the jiggering may be done at room temperature only under certain specific limited conditions.)

With the jiggering profile tool made of special material containing lubricating material such as nylon plastic containing molybdenum compound, heating a profile tool was not necessary but a revolution difference of 50 to 100 r.p.m. was also required between the tool and the associated jigger (mold). In contrast thereto, with the profile tool of the present embodiment, however, jiggering can be carried out without forcibly rotating the profile tool. In other words, the tool of the present invention may be rotated free of positive (separate) driving, i.e., rotating freely following the associated jigger (mold) for jiggering. Continuous blowing of the gas can prevent the surface irregularities such as rough surface or recess formation which may otherwise be caused by adhesion of plastic clay under rolling pressure exerted during the jiggering of plastic clay.

A dry gas is designed to be blown through a nozzle or a plurality of nozzles disposed near the jiggering surface. The profile tool is mounted in place on a jiggering apparatus. It is presumed that the plastic clay is freed from a roll-deforming state (due to the decrease of the interdistance between the tool and mold caused by the descending of the tool) to a substantially atmospheric pressure state at the time of jiggering being completed.

With the conventional heated tool, it was usually impossible to prevent sticking of plastic clay to the jiggering surface, unless a specific formulation of plastic clay having a water content of 20 to 22% by weight is used. When using the tool of the present invention under the aforesaid conditions, however, it was possible to effect jiggering of plastic clay having a water content as high as 25% by weight without any hindrance. In addition, the surface of the portion of the plastic clay to be subjected to jiggering gives a beautiful skin having no trace of the recesses or scores.

Reference will next be made to a specific embodiment according to the first aspect of the present invention, referring to FIG. 2 and FIG. 3, wherein a gas is blown onto the profile tool from the outside thereof.

In the rotary type jiggering method, a metal material is usually used as the jiggering profile tool material, and is heated for jiggering. In the jiggering of plastic clay with that tool, a (preferably dry) gas is fed into a space therebetween from the outside, using a nozzle 19 (preferably in the slot or sector from). Preferably, gas blowing is effected along the direction of rotation of the jigger (or profile tool). Namely, gas is preferably blown in a tangential direction of the rotating bodies along the rotating direction thereof towards the contact portion 20 (line) of the tool and the plastic clay so as to provide a gas film therebetween. In this case, practically good jiggering can be achieved by applying low-temperature heating of about 50° to about 60° C. to the tool. Note that a heating temperature of 95° to 105° C. was practically required in the prior art. A gas blowing pressure may be such that can well control the direction of the gas flow (about 0.1 to 0.5 kgf/cm$^2$), and may not necessarily be on the order of as high as 1 kgf/cm$^2$. Experiments have taught that the rate of dry air supply is suitable at 35 1/min and 20 1/min for 8- and 6-inch dishes at a tool temperature of 60° C., respectively, as well as 35 1/min and 27 1/min for 8- and 6-inch dishes at 50° C. By decreasing the tool temperature by 40°-50° C., compared with the conventional one, it is possible to use a type of plastic clay having a water content that is higher than that of the type in the heated tool so far used in the prior art by about 1%. This helps to decrease the amount of loads applied on the jiggering apparatus and, hence, on the clay extruder or mixer, too. As a matter of course, it is also possible to use plastic clay having the same water content as that of plastic clay used with the conventional tool. It is further understood that the profile tool may be either of the inner type or of the outer type.

The foregoing embodiment has the following characteristic features, correspondingly. 1. Since the temperature to which the tool is to be heated is low, it is possible to achieve some energy saving and improvements in the working environment and the skill in temperature control can be eliminated. 2. Since jiggering can be effected with plastic clay having a higher water content, it is possible to increase the capability of the jiggering apparatus and clay extruder. 3. There is no possibility of any failure and cracking due to overheating of the tool. 4. Jiggering can be effected with plastic clay having a wider range of water contents and further reduced amounts of clay (as the plastisizer).

Further, since it is possible to avoid sticking and adhesion of plastic clay to the tool, which may occur with respect the heated tool to a high temperature, plastic clay softer than that used with the heated tool can be employed resulting in a reduction in the load applied to the jiggering apparatus.

Throughout the embodiments according to the present invention, no particular limitation is imposed upon the temperature of the gas (air) used. With a high-pressure gas, cooling takes place usually due to adiabatic expansion, and with low- or normal-pressure gas blowing, a gas temperature is maintained after blowing. By the heating or regulation of the gas temperature, the rate of jiggering can be slightly increased.

In the following, the present invention will be explained in detail with reference to the examples.

EXAMPLE 1

With the jiggering apparatus incorporated with the jiggering profile tool formed of a metallic material, jiggering was effected, while an amount of air was fed to produce an air film, not a steam film, between the tool and a clay blank (batt) which has been preliminarily shaped into a disk.

This profile tool as shown in FIG. 1 was used for the jiggering of various types of plastics clay having water contents of 21 to 26% (incorporated with 5 to 50% by weight of clay for providing plasticity as well as kaolin, quartz, feldspar and the like) to obtain therefrom dishes measuring 6 to 10.5 inches in diameter and G4 to 5 mm in the thickness of the major portions, as measured after firing (sintering). The jigger and the profile tool were rotated at 320–360 r.p.m. and 300–340 r.p.m. in the same direction, respectively, and air was fed at a pressure of 0.5 kgf/cm$^2$. The resulting shaped products were more excellent in quality than those obtained with the conventional heated tool, and exhibited well quality after sintering.

In this connection, similar jiggering was carried out with the tool and mold of the similar shapes by the conventional heated tool method (gas burner heating) at about 100° C. However, any satisfactory jiggering could not be effected, unless a water content of 21±0.5% by weight was maintained.

FIG. 1 shows a main part of the jiggering apparatus used in this embodiment of the present invention in a state where the jiggering has been just completed. The rotary jiggering profile tool 3A includes a lower jiggering surface 3C directed to the bottom, and faces a molding surface 17A of a mold 17 (which is supported on a mold base 16 for rotation around the axis of rotation 15) at a given gap t (equal to the thickness of a shaped product). That tool is then fixed to a flange 7 disposed at the lower end of rotary shaft 8 by bolts 13 through an O-ring 12. The center axis 19A of the shaft 8 intersects the axis of rotation 15 at an angle of $\theta$ with the intersection being in substantial coincidence with the center of the jiggering surface 3C.

A heat supply inlet 5 and outlet (not shown) extend through the center of the rotary shaft 8, and communicate with a heat source (steam, hot water or the like heating medium) via a rotary joint 9. A chamber 4 is opened at the lower end of the inlet 5 for the distribution of the heating medium over the entire tool through circulating passages (not shown). The rotary shaft 8 is supported by a (vertically movable) supporting member, not shown, through bearings 10 and 11. A clay blank or batt undergoes a rolling and jiggering action produced by the relative rotation of the mold 17 and the tool 3A with the given gap t, thus giving a shaped product 18 having a uniform density and a smooth surface. Heating may be conducted by electric energy, wherein an electric heating element is disposed within the tool and the electric energy is supplied through lead lines disposed in the rotary shaft.

EXAMPLES AND COMPARATIVE EXPERIMENTS

Experiments have been made to investigate the difference of the present invention from the prior art as disclosed in JP-kokai 56-75812. The following results show that JP-kokai 56-75812 can be applied only to a limited range, e.g., with respect to the shape of the products to hollow wares like cups, whereas the present invention assures wide application including flat wares, too. 1. Relationship between the rotational speed and the amount of blown air (jiggering profile tool rotates following the jigger)

1—1 Dishes (apparatus: FIGS. 2 and 3)

When the rotational speed becomes high as double as the plastic clay is spun and scattered off of the mold surface due to a centrifugal force exerted to each portion of the plastic clay. When the centrifugal force is large, it will overcome a sum of the self-adhering force of the plastic clay particles with each other (tensile strength), gravity and an adhering force of the gypsum mold produced by water absorption, resulting in centrifugal spin off thereof during the jiggering operation. Usually the jiggering of the dishes is effected as shown in FIG. 2, i.e., the concave surface is disposed on the mold having a corresponding convex contour. Thus marginal rim portion of the plastic clay is secured on the mold mainly by the gravity and the adsorbing force of the mold during its angular position outside the rolling (contact) surface area 20.

Figure 4:
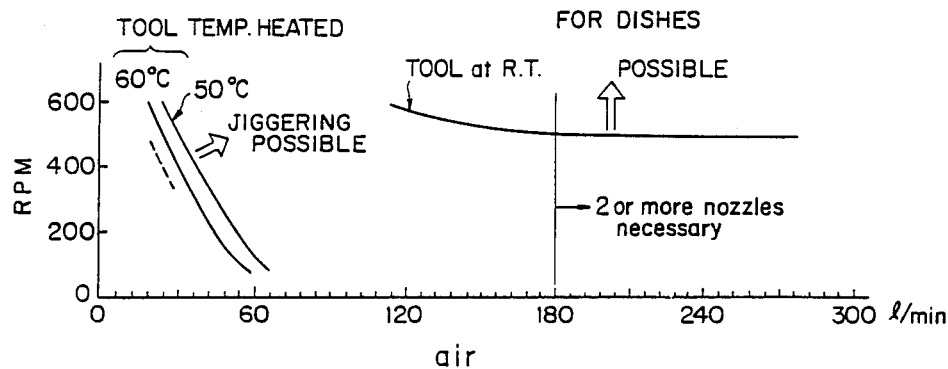
FIGS. 4 and 5 are graphs showing the jiggering possible region depending on the rotational speed versus the amount of blown air at different temperatures of the profile tool for dishes and cups, respectively.

The jiggering experiments were conducted at different temperatures of the jiggering profile tool (room temperature, 50° C., 60° C. etc.). As shown in FIG. 4, the area where the jiggering can be made successfully is very limited to an area with high speed rotation above 500 r.p.m. and a large air volume above 120 1/min. at room temperature, while at the low-temperature heating (50°-60° C.) the area is significantly expanded.

The blowing nozzles should open directed to both sides of the bottom annular protrusion of the dish. At 600 r.p.m. or below (, i.e., normally acceptable rotational speed range), about 20 1/min. of air blowing enables the jiggering.

1-2 Hollow wares (Cup etc.)

Figure 2:
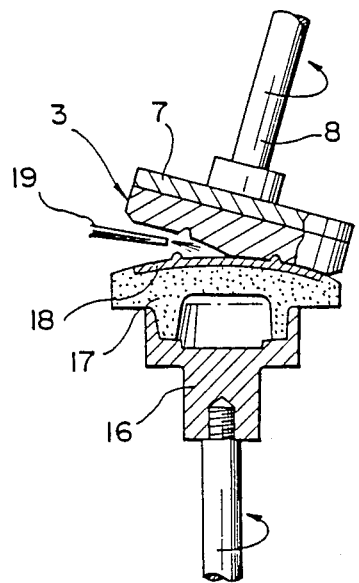
FIG. 2 is a sectional view showing one embodiment of the present invention.
Figure 3:
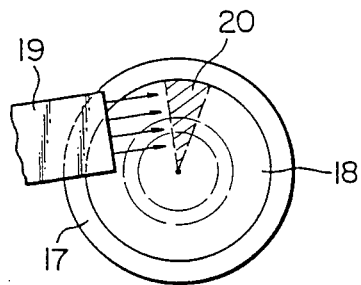
FIG. 3 is a schematic diagram showing the embodiment of FIG. 2 as viewed from the top by removing the profile tool 3.
Figure 5:
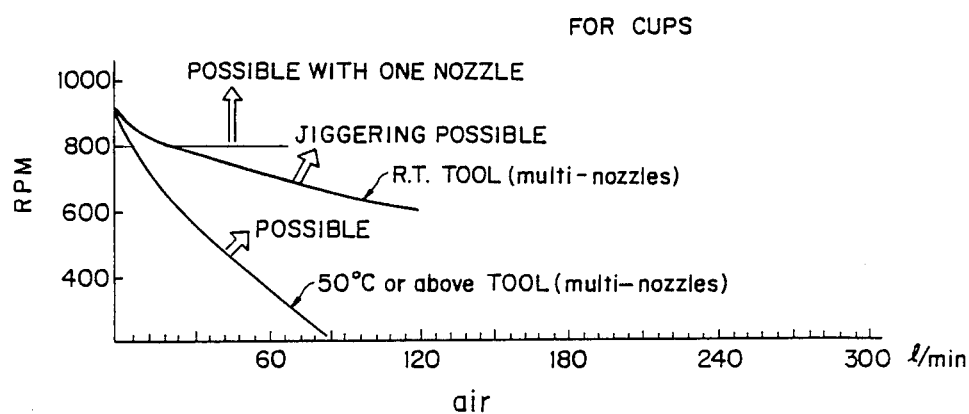
Figure 9:
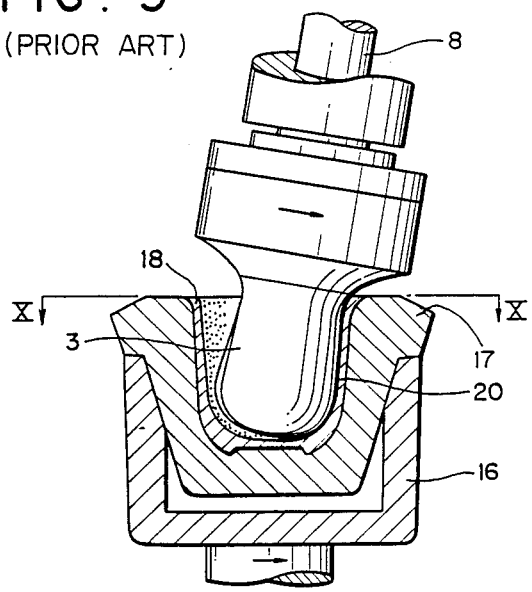
FIGS. 9 and 10 illustrate the conventional methods of JP-kokai No. 56-75812 (FIGS. 1-2).
Figure 10:
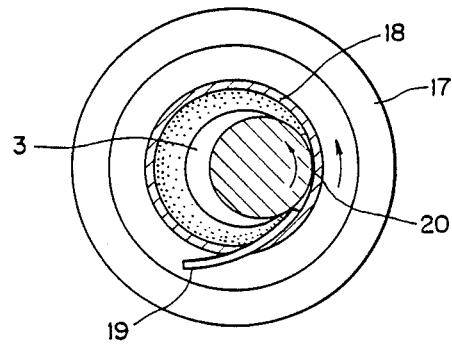

According to the apparatus disclosed in FIGS. 1 and 2 of JP-kokai 56-75812 the experiments were conducted (see FIGS. 9 and 10 of the present application). The results are shown in FIG. 5. Significant difference is observed between the non-heated jiggering profile tool and the low-temperature heated jiggering profile tool (50° C. or above). At the normal rotational speed of 600 r.p.m. or below and without heating of the jiggering profile tool, successful jiggering is difficult without applying a large amount of air blowing (120 1/min. or above). Below this air blowing amount, the surface irregularities occur such as roughening, recess formation, scoring etc.

Without the inventive measure (i.e., without airblowing and low temperature heating of the tool), the plastic clay would have to be controlled to an ideal condition by controlling the compositional proportion thereof (e.g., increasing the amount of clay etc.) to an ideal range having a good plastic deformability and flowability during the jiggering operation. However, this range is very limited and the rotational speed of the jiggering profile tool must be forcively controlled.

High rotational speed above 900 can be applied to the hollow wares because the increased centrifugal force exerted to the plastic clay within the mold (hollow space) urges the plastic clay to be pressed onto the mold. Thus there is no spinning off of the plastic clay occurs in this case. Besides, the rolled out direction of the plastic clay through the jiggering is vertical which is substantially normal to the direction of the centrifugal force.

Accordingly the rotational speed can be increased up to a maximum level which would be defined by the apparatus itself in view of the safety.

Stillmore, it has turned out that at a high rotational speed (about 900 r.p.m. or above) there would be no need to make air blowing. However, at a relatively low rotational speed, it requires the air-blowing with the low-temperature heating of the jiggering profile tool.

Figure 6:
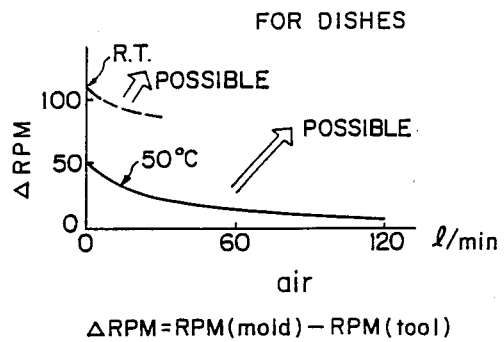
FIGS. 6 and 7 are graphs showing the jiggering possible region depending on the difference of the rotational speed ΔRPM versus the amount of blown air at different temperatures of the profile tool for dishes and cups, respectively.
Figure 7:
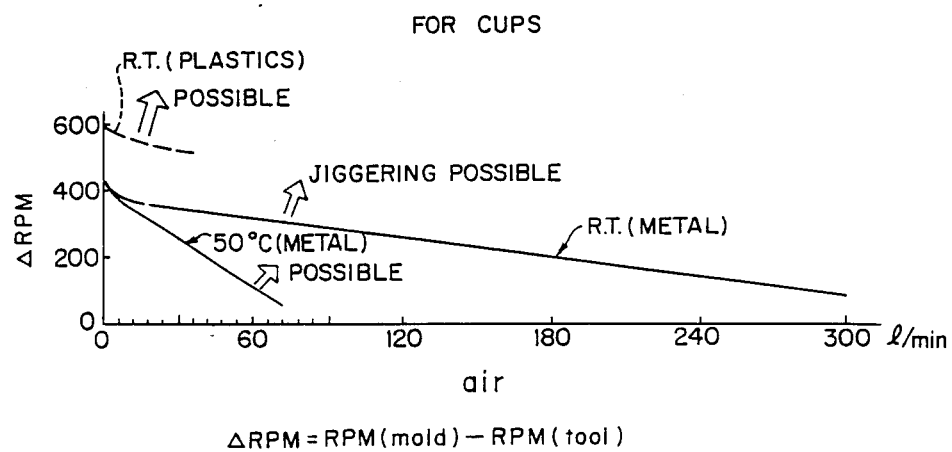

As evident from FIGS. 6 and 7, the dishes allow relatively narrower region of the rotational speed difference ($\Delta RPM$) than the cups. Further, at the low-temperature heating of the tool, the allowable area for jiggering expands significantly with a reduced amount of the air blowing. 3. Adhesion of small pieces of plastic clay to the jiggering profile tool This property was investigated by employing the apparatus as shown in FIG. 2 at different clay contents (40, 50%) and at different tool temperatures (room temperature and 50° C.). The rate of occurrence of recess defects (%) is illustrated versus the amount of blown air (1/min.) in FIG. 8A. The recess defects were observed on the as-shaped (jiggered) green products.

Generally, even within the allowable region for jiggering small pieces of plastic clay adheres to the jiggering surface of the jiggering profile tool where the jiggering profile tool is used at the room temperature. Such accumulated pieces of plastic clay form protruding defects on the tool, which causes recess defects on the jiggered products. This type of defects frequently occurs at the central bottom of the cups while at the corner 18A portion of the round (or annular) contour of the dish as shown in FIG. 8B.

Figure 8A:
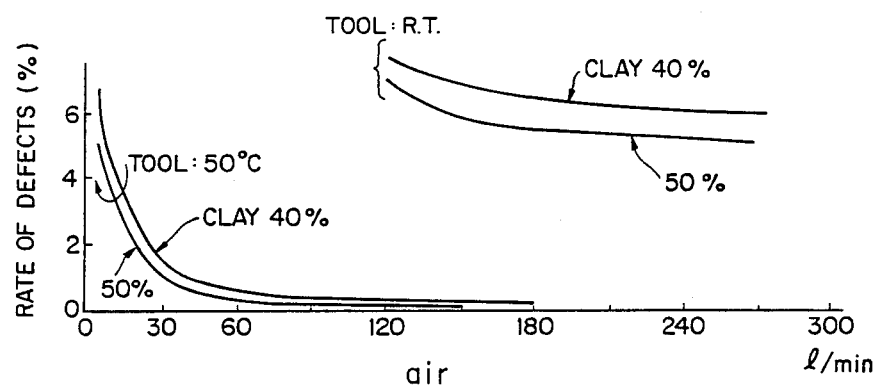
FIG. 8A is a graph showing the defect rate versus the amount of blown air at different temperatures of the tool and clay contents in the plastic clay.
Figure 8B:
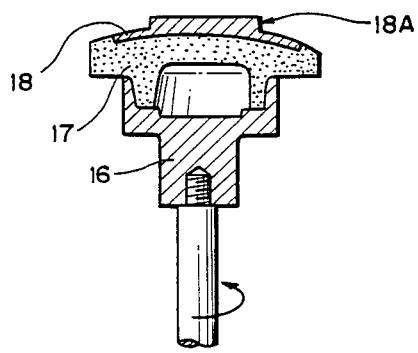
FIG. 8B illustrates a portion where defects are observed.

As evident from FIG. 8A, the inventive method with the low-temperature heated tool drastically decreases the occurrence of such recess defects even at a small amount of the blown air.

In summary of the experimental results, the following embodiments are contemplated preferred.

(1) Amounts blown air (1/min.) is at least 20 (more preferably 30 or more, most preferably 60 or more). (N.B. The temperature of air affects the quality and productivity very little.)

(2) Heating of the jiggering profile tool: 50°-60° C. (However, if certain rotational speed difference is controlled between the mold and the jiggering profile tool, jiggering without heating the tool would be acceptable under the limited conditions.)

(3) The rotational speed of the jigger can be at the normal range (below 600 r.p.m., preferably below 400 r.p.m., most preferably 300-340 r.p.m.) for the dishes, while the cups allow higher speed.

(4) The relative rotational speed difference between the mold and the profile tool ($\Delta RPM = RPM$ (mold)-RPM (tool)) is controlled in conjunction with the air amount according to the low temperature heating of the profile tool.

For dishes, $\Delta RPM$ and air amount should be within the area above the line extending from 60 (at air zero) to 10 (at 120 1/min.) in FIG. 6. For cups, $\Delta RPM$ and air amount should be within the area above the line extending from 420 (at air zero) to 0 (at air 80) in FIG. 7. (However, if this difference $\Delta RPM$ is at least 100 for dishes and at least 600 for cups, respectively, the jiggering is possible without heating the profile tool and air blowing.)

(5) A jiggering method by gas film formation and low-temperature heating of the profile tool, wherein the profile tool is maintained at 50°-60° C., the RPM difference of the profile tool versus the mold is 0 to 300 RPM (preferably 0-60 RPM for outer profile tool) and the amount of air ejection is 30-300 1/min.

Further, the following methods are also contemplated to be possible based on the foregoing experimental results.

(i) A jiggering method (without heating of the profile tool) wherein the rotation of the rotary profile tool is controlled (by braking or separate driving) to provide a RPM difference from the mold by at least 110 RPM (using an outer profile tool for flat wares), or by at least 420 RPM (using an inner profile tool for hollow wares). Under these conditions, the gas ejection may be eliminated.

(ii) A jiggering method (with low-temperature heating of the profile tool at 50°-60° C.) wherein the profile tool has a RPM difference from the mold by 60-600 RPM (preferably by 60-200 RPM for outer profile tool).

(iii) A jiggering method wherein the RPM difference of the profile tool from the mold is 0-400 RPM (preferably 0-100 RPM for the outer profile tool), and the amount of blown air is 30-400 1/min. The profile tool heating may be eliminated.

What is claimed is:

1. A jiggering method for ceramic ware plastic clay comprising:
   (a) providing a charge of said plastic clay on a jigger;
   (b) providing a jiggering profile tool having a jiggering surface disposed relative to said jigger and plastic clay such that during the jiggering operation the jiggering surface of said profile tool is in contact with less than the entire surface area of said plastic clay charge; and
   (c) jiggering said plastic clay charge into ceramic ware by contacting said surface of the profile tool to said plastic clay charge while rotating said profile tool and said plastic clay charge and providing a thin gas film between said plastic clay and said jiggering surface of the profile tool by supplying said jiggering surface of the profile tool with a gas by ejecting the gas from the outside of said jiggering surface while heating said jiggering profile tool at a temperature in the range of about 50° C. to about 60° C. by heat separate from said ejected gas, thereby preventing said plastic clay from sticking to said profile tool.

2. The method as defined in claim 1, in which jiggering is effected with said jiggering profile tool which is rotated independently of or following the rotation of a jigger, or is stationary.

3. The method as defined in claim 2, in which the profile tool has a difference in the relative rotational speed from a mold secured on the jigger.

4. The method as defined in claim 3, in which the rotational speed difference is controlled in relation with the amount of blown gas.

5. A method according to claim 4 wherein the rotational speed difference ΔRPM defined by ΔRPM=RPM(mold-RPM(profile tool) can be plotted on a graph versus amount of air supplied above a line labeled 50° C.

6. The method as defined in claim 4, in which the rotational speed difference is controlled in relation with the temperature of the profile tool.

7. A method according to claim 6 wherein the rotational speed difference ΔRPM defined by ΔRPM=RPM(mold-RPM(profile tool) can be plotted on a graph versus amount of air supplied above a line labeled 50° C.

8. The method as defined in claim 1, in which said gas is ejected through a nozzle or nozzles disposed in the vicinity of the contact surface between plastic clay and the jiggering profile tool.

9. The method as defined in claim 1, in which the gas is pressurized gas.

10. The method as defined in claim 9, in which the gas has a pressure of at least 0.1 kgf/cm$^2$.

11. The method as defined in claim 9, in which the gas has a pressure no more than 1 kgf/cm$^2$.

12. The method as defined in claim 11, in which the gas pressure is no more than 0.5 kgf/cm$^2$.

13. The method as defined in claim 1, in which the gas is ejected in an amount of at least 20 1/min.

14. The method as defined in claim 13, in which the gas is ejected in an amount of at least 30 1/min.

15. The method as defined in claim 14, in which the gas is ejected in an amount of at least 60 1/min.

16. A jiggering apparatus for ceramic ware plastic clay, comprising:
   a rotatable jiggering profile tool having a jiggering surface disposed relative to a jigger and plastic clay such that during the jiggering operation, the jiggering surface of said profile tool is in contact with less than the entire surface area of said plastic clay charge,
   a jigger driven by a driving unit,
   a mold secured on the jigger,
   gas supply means for ejecting a gas from the outside of said jiggering surface into a space between the jiggering surface of said tool and a charge of plastic clay,
   means separate from the heat of said ejected gas for heating and temperature-controlling said jiggering profile tool at a temperature in the range of about 50° C. to about 60° C., and
   means for controlling the relative rotational speed difference between the mold and the profile tool in relation with the amount of the gas to be ejected, thereby providing a thin film between said plastic clay and the jiggering surface of said tool to prevent the plastic clay from sticking to said jiggering surface during jiggering operation.

* * * * *